US009614965B2

(12) United States Patent
Chen

(10) Patent No.: US 9,614,965 B2
(45) Date of Patent: Apr. 4, 2017

(54) ELECTRONIC DEVICE AND METHOD FOR TRANSMITTING VOICE MESSAGES

(71) Applicant: Chiun Mai Communication Systems, Inc., New Taipei (TW)

(72) Inventor: Mu-Ann Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 280 days.

(21) Appl. No.: 14/217,527

(22) Filed: Mar. 18, 2014

(65) Prior Publication Data

US 2014/0323098 A1    Oct. 30, 2014

(30) Foreign Application Priority Data

Apr. 26, 2013  (TW) .............................. 102115177 A

(51) Int. Cl.
*H04W 4/12* (2009.01)
*H04M 3/533* (2006.01)

(52) U.S. Cl.
CPC .................. *H04M 3/53366* (2013.01); *H04M 2203/4554* (2013.01)

(58) Field of Classification Search
None
See application file for complete search history.

(56) References Cited

U.S. PATENT DOCUMENTS

| 5,153,905 | A | * | 10/1992 | Bergeron | ............... | H04M 11/10 |
| | | | | | | 379/209.01 |
| 5,710,803 | A | * | 1/1998 | Kowal | ................... | H04M 11/04 |
| | | | | | | 379/41 |
| 7,564,958 | B1 | * | 7/2009 | Contractor | .......... | H04M 3/4872 |
| | | | | | | 379/88.14 |
| 8,385,962 | B1 | * | 2/2013 | Gailloux | ................. | H04W 4/10 |
| | | | | | | 455/518 |
| 2002/0101970 | A1 | * | 8/2002 | Contractor | ............ | H04M 3/424 |
| | | | | | | 379/209.01 |
| 2004/0143841 | A1 | * | 7/2004 | Wang | ..................... | G06Q 30/02 |
| | | | | | | 725/32 |

(Continued)

FOREIGN PATENT DOCUMENTS

TW          201034433 A        9/2010

*Primary Examiner* — Vladimir Magloire
*Assistant Examiner* — Frank Donado
(74) *Attorney, Agent, or Firm* — Steven M. Reiss

(57) ABSTRACT

A method of transmitting voice messages using a first electronic device includes receiving a phone number of a second electronic device using an input device of the first electronic device. A voice messages of a user is recorded, and based on the voice messages, an audio file is obtained by encoding the voice messages using voice encoding methods. A communication is established between the first electronic device and the second electronic device by dialing the phone number of the second electronic device. when the communication between the first electronic device and the second electronic device is established, audio communication signals of the audio file are acquired by encoding the audio file, and the audio communication signals are inserted into an input port of a voice communication channel of the first electronic device. The audio communication signals are transmitted to the second electronic device through the voice communication channel.

12 Claims, 3 Drawing Sheets

(56) References Cited

U.S. PATENT DOCUMENTS

| | | | |
|---|---|---|---|
| 2006/0121955 A1* | 6/2006 | Shlomot | H04W 52/28 455/574 |
| 2008/0013471 A1* | 1/2008 | Kim | H04L 12/581 370/312 |
| 2009/0111529 A1* | 4/2009 | Miyake | H04M 1/274516 455/569.2 |
| 2011/0093276 A1* | 4/2011 | Ramo | G10L 19/008 704/500 |

* cited by examiner

ELECTRONIC DEVICE AND METHOD FOR TRANSMITTING VOICE MESSAGES

BACKGROUND

1. Technical Field

Embodiments of the present disclosure relate to voice message technology, and particularly to an electronic device and a method of transmitting voice messages.

2. Description of Related Art

When a first user makes a phone call to a second user, and the second user does not answer his phone, the first user can leave a voice message for the second user. However, if the second user does not return the call, the first user will not know if the second user listened to his message or whether the message was recorded in the voice mailbox. In addition, after leaving the voice message, the first user cannot delete the voice messages in the communication device of the second user.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device.

Figure 1:
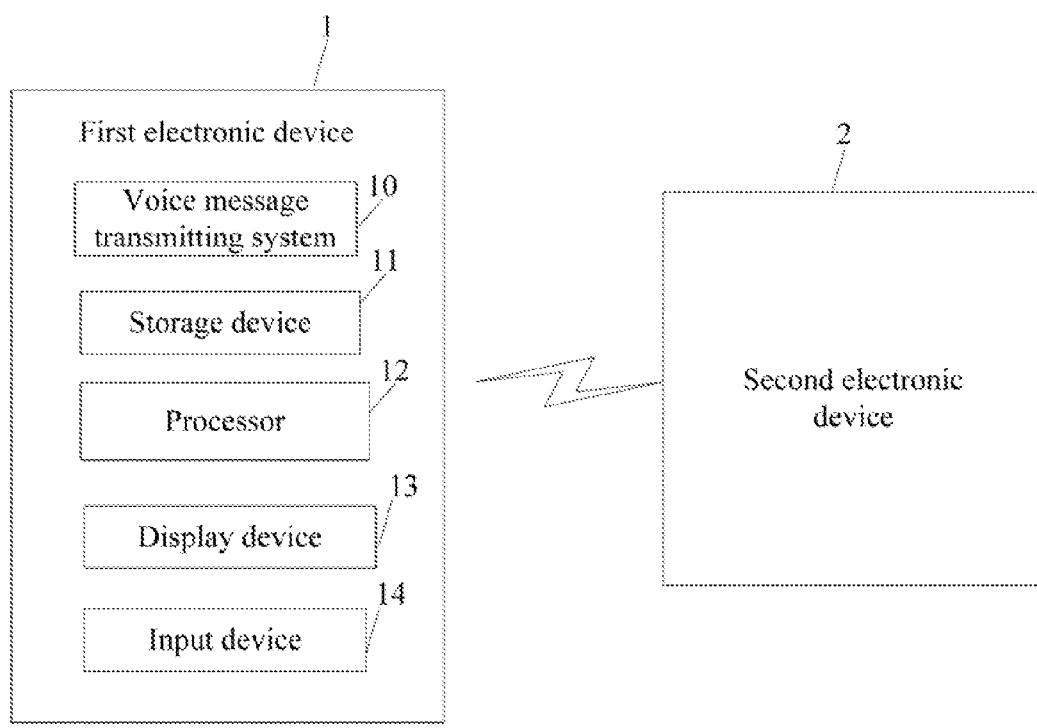
FIG. 1 is a block diagram of one embodiment of a first electronic device including a voice message transmitting system.

FIG. 1 is a block diagram of one embodiment of a first electronic device 1 including voice message transmitting system 10 (hereinafter "the system 10"). The first electronic device 1 is in connection to a second electronic device 2. The first electronic device 1 includes a storage device 11, at least one processor 12, a display device 13, and an input device 14. The first electronic device 1 and the second electronic device 2 may be computers, smart phones or personal digital assistants (PDAs), or other kinds of computing devices. It should be understood that FIG. 1 illustrates only one example of the first electronic device 1 that may include more or fewer components than illustrated, or have a different configuration of the various components in other embodiments.

When a user of the first electronic device 1 leaves voice messages to another user of the second electronic device 2, the system 10 can ensure the another user listens to the voice messages and all of the voice messages are transmitted to the another user.

In one embodiment, the storage device 11 may include some type(s) of computer-readable non-transitory storage medium, such as a hard disk drive, a compact disc, a digital video disc, or a tape drive. The display device 13 may display images and videos, and the input device 14 may be a mouse or a keyboard used to input computer readable data.

Figure 2:
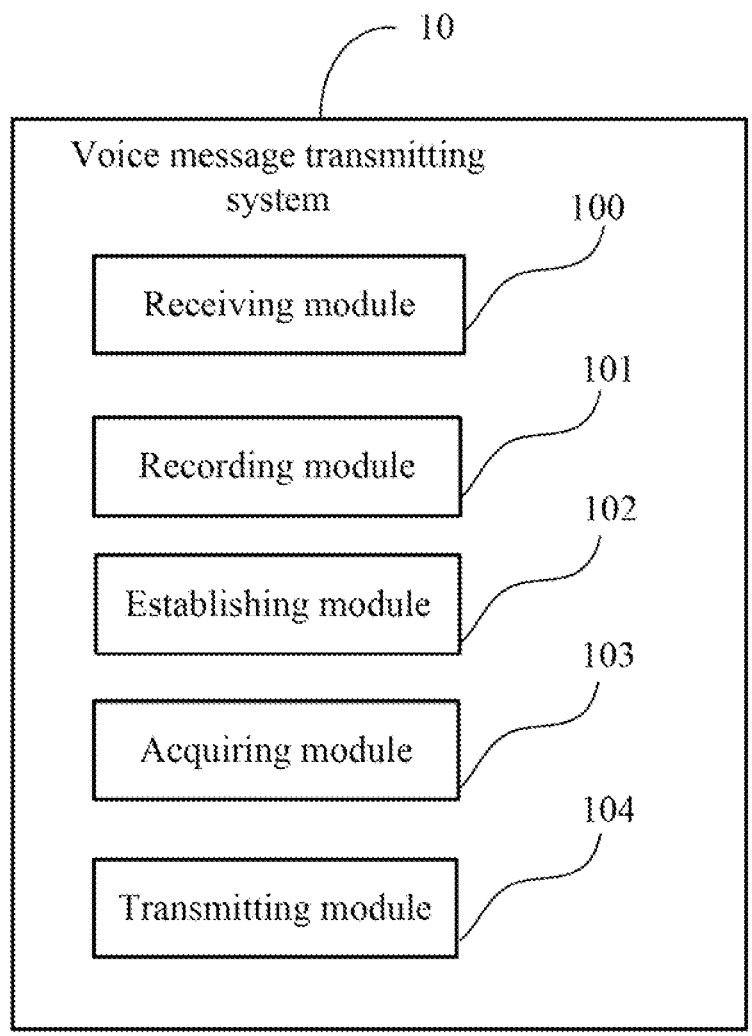
FIG. 2 is a block diagram of one embodiment of function modules of the voice message transmitting system in the first electronic device of FIG. 1.

FIG. 2 is a block diagram of one embodiment of function modules of the system 10. In one embodiment, the system 10 may include a receiving module 100, a recording module 101, an establishing module 102, an acquiring module 103, and a transmitting module 104. The function modules 100-104 may include computerized codes in the form of one or more programs, which are stored in the storage device 11. The processor 12 executes the computerized codes, to provide functions of the function modules 100-104. A detailed description of the function modules 100-104 is given in reference to FIG. 3.

Figure 3:
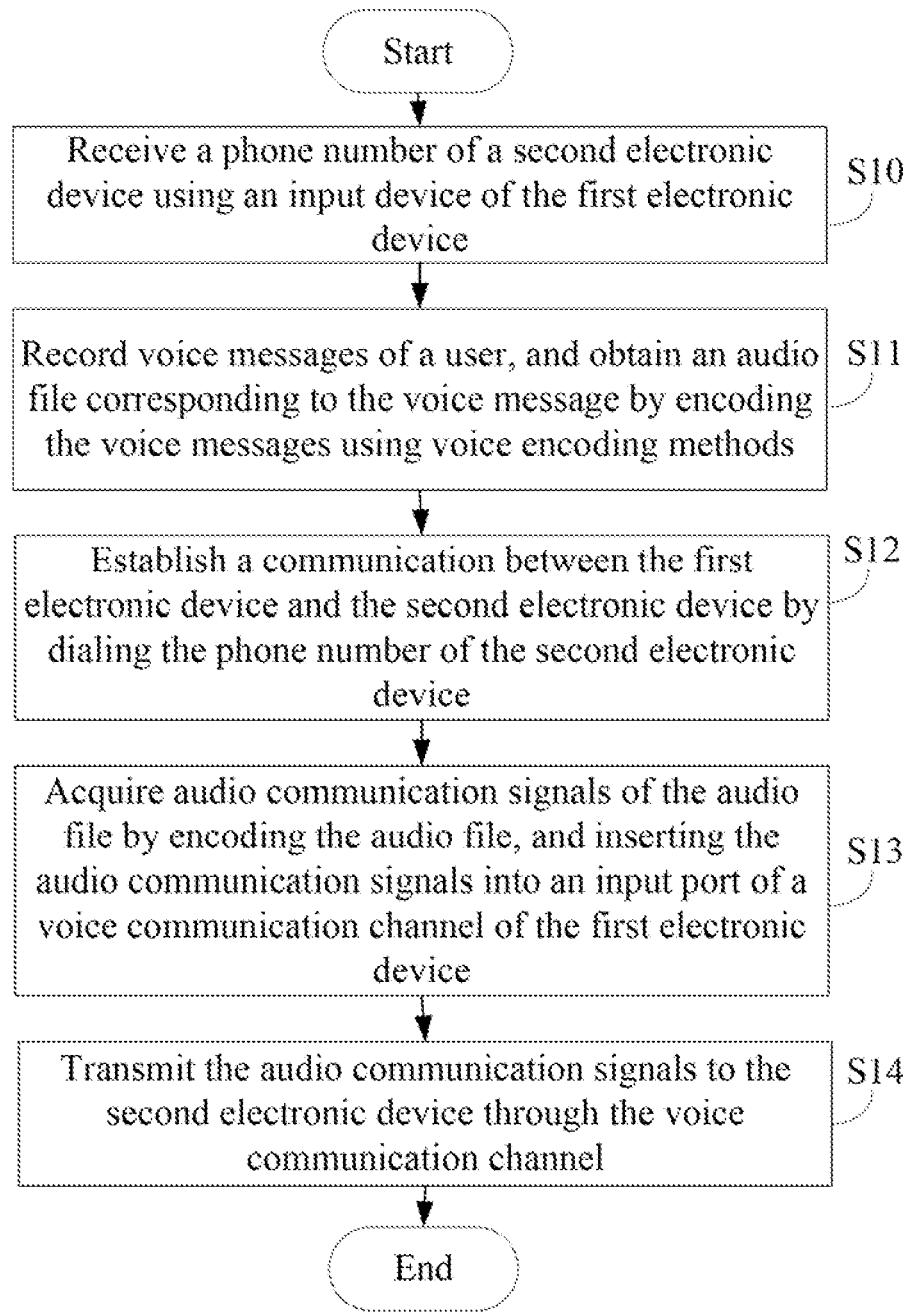
FIG. 3 illustrates a flowchart of one embodiment of a method of voice message transmitting in the first electronic device of FIG. 1.

FIG. 3 illustrates a flowchart of one embodiment of a method of transmitting voice messages using the first electronic device 1 of FIG. 1. Depending on the embodiment, additional steps may be added, others removed, and the ordering of the steps may be changed.

In step S10, an application for transmitting voice messages is started, a user of the first electronic device 1 inputs a phone number of the second electronic device 2 using an input device 14 of the first electronic device 1, and the receiving module 200 receives the phone number of the second electronic device 2.

In step S11, a user interface of the application for transmitting voice messages includes a key having a function of recording voice messages. When the user presses the key, the recording module 101 records voice messages of the user. Based on the voice messages, the recording module 101 obtains an audio file corresponding to the voice messages by encoding the voice messages using voice encoding methods. In some embodiment, the voice encoding methods include Variable-Rate Multimode Wideband (VMR-WB). The VMR-WB is a standard of voice encoding which is based on 3GPP/UMTS/GSM.

In step S12, the establishing module 102 establishes a communication between the first electronic device 1 and the second electronic device 2 by dialing the phone number of the second electronic device 2 using the first electronic device 1. Therefore, when the communication between the first electronic device 1 and the second electronic device 2 is established, it is represented that another user of the second electronic device 2 is answering a phone call of the first electronic device 1. Then the voice messages of the user of the first electronic device 1 are transmitted to the second electronic device 2.

In some embodiments, the establishing module 102 dials the phone number at each predetermined time interval (e.g. 1 second) until the communication between the first electronic device 1 and the second electronic device 2 is established. Each time the establishing module 102 dials the phone number, the establishing module 102 stores a number of times (e.g., 3) for dialing the phone number and dialing time (e.g., AM 10:30) of dialing the phone number in the first electronic device 1. In some embodiments, when the communication between the first electronic device 1 and the second electronic device 2 is established, the establishing module 102 clears the stored number of times of dialing the phone numbers and the stored dialing time.

In step S13, when the communication between the first electronic device 1 and the second electronic device 2 is established, the acquiring module 103 acquires audio communication signals of the audio file by encoding the audio file, and the acquiring module 103 inserts the audio communication signals into an input port of a voice communication channel of the first electronic device 1.

In step S14, the transmitting module 104 transmits the audio communication signals to the second electronic device 2 through the voice communication channel.

In other embodiments, as the communication may be interrupted, that is, maybe some audio communication signals are not transmitted to the second electronic device 2 successfully for one time, the transmitting module 104 determines whether all of the audio communication signals have been transmitted to the second electronic device 2. When any audio communication signal has not been transmitted to the second electronic device 2, the transmitting module 104 continues dialing the phone number at each predetermined time interval until all of the audio communication signals have been transmitted to the second electronic device 2. When all of the audio communication signals have been transmitted to the second electronic device 2, the transmitting module 104 displays a prompt on the display device 13, for indicating a user whether the audio file in the first electronic device 1 needs to be deleted, and the transmitting module 104 returns a message on the display device 13, for prompting the user of the first electronic device 1 that the another user of the second electronic devices 2 having listened to the voice messages of the user of the first electronic device 1. It is ensured that the another user listens to the voice messages of the user of the first electronic device 1.

It should be emphasized that the above-described embodiments of the present disclosure, including any particular embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for transmitting voice messages being executed by at least one processor of a first electronic device, the method comprising:
   receiving a phone number of a second electronic device using an input device of the first electronic device;
   recording voice messages of a user, and obtaining an audio file corresponding to the voice messages by encoding the voice messages using voice encoding methods;
   establishing a communication between the first electronic device and the second electronic device by dialing the phone number of the second electronic device, the step of establishing the communication further comprising:
   dialing the phone numbers at a predetermined time interval until a communication between the first electronic device and the second electronic device is established: and
   acquiring audio communication signals of the audio file by encoding the audio file, and inserting the audio communication signals into an input port of a voice communication channel of the first electronic device when the communication between the first electronic device and the second electronic device is established; and
   transmitting the audio communication signals to the second electronic device through the voice communication channel; and
   when all of the audio communication signals have not been transmitted to the second electronic device,
   continuing dialing the phone number at each of the predetermined time interval until all of the audio communication signals associated with the audio file have been transmitted to the second electronic device and displaying, on a display device of the first electronic device, a prompt for indicating a user whether the audio file needs to be deleted.

2. The method according to claim 1, the method further comprising:
   determining whether all of the audio communication signals have been transmitted to the second electronic device;
   continuing dialing the phone number at each of the predetermined time interval until all of the audio communication signals have been transmitted to the second electronic device.

3. The method according to claim 1, wherein the voice encoding methods comprises Variable-Rate Multimode Wideband (VMR-WB).

4. The method according to claim 2, wherein when all of the audio communication signals have not been transmitted to the second electronic device, a prompt for indicating a user whether the audio file needs to be deleted is displayed on a display device of the first electronic device.

5. A first electronic device; comprising:
   a processor; and
   a storage device that stores one or more programs, when executed by the at least one processor, causes the at least one processor to perform a method for transmitting voice messages, the method comprising:
   receiving a phone number of a second electronic device using an input device of the first electronic device;
   recording voice messages of a user, and obtaining an audio file corresponding to the voice messages by encoding the voice messages using voice encoding methods;
   establishing a communication between the first electronic device and the second electronic device by dialing the phone number of the second electronic device, the step of establishing the communication further comprising:
   dialing the phone numbers at a predetermined time interval until a communication between the first electronic device and the second electronic device is established: and
   acquiring audio communication signals of the audio file by encoding the audio file, and inserting the audio communication signals into an input port of a voice communication channel of the first electronic device when the communication between the first electronic device and the second electronic device is established; and
   transmitting the audio communication signals to the second electronic device through the voice communication channel; and
   when all of the audio communication signals have not been transmitted to the second electronic device,
   continuing dialing the phone number at each of the predetermined time interval until all of the audio communication signals associated with the audio file have been transmitted to the second electronic device and displaying, on a display device of the first electronic device, a prompt for indicating a user whether the audio file needs to be deleted.

6. The first electronic device according to claim 5, the method further comprising:
   determining whether all of the audio communication signals have been transmitted to the second electronic device;
   continuing dialing the phone number at each of the predetermined time interval until all of the audio communication signals have been transmitted to the second electronic device.

7. The first electronic device according to claim 5, wherein the voice encoding methods comprises Variable-Rate Multimode Wideband (VMR-WB).

8. The first electronic device according to claim 6, wherein when all of the audio communication signals have not been transmitted to the second electronic device, a prompt for indicating a user whether the audio file needs to be deleted is displayed on a display device of the first electronic device.

9. A non-transitory storage medium having stored thereon instructions that, when executed by a processor of a first electronic device, causes the processor to perform a method for transmitting voice messages, wherein the method comprises:
   receiving a phone number of a second electronic device using an input device of the first electronic device;
   recording voice messages of a user, and obtaining an audio file corresponding to the voice messages by encoding the voice messages using voice encoding methods;
   establishing a communication between the first electronic device and the second electronic device by dialing the phone number of the second electronic device, the step of establishing the communication further comprising:
   dialing the phone numbers at a predetermined time interval until a communication between the first electronic device and the second electronic device is established; and
   acquiring audio communication signals of the audio file by encoding the audio file, and inserting the audio communication signals into an input port of a voice communication channel of the first electronic device when the communication between the first electronic device and the second electronic device is established; and
   transmitting the audio communication signals to the second electronic device through the voice communication channel; and
   when all of the audio communication signals have not been transmitted to the second electronic device,
   continuing dialing the phone number at each of the predetermined time interval until all of the audio communication signals associated with the audio file have been transmitted to the second electronic device and displaying, on a display device of the first electronic device, a prompt for indicating a user whether the audio file needs to be deleted.

10. The non-transitory storage medium according to claim 9, the method further comprising:
    determining whether all of the audio communication signals have been transmitted to the second electronic device;
    continuing dialing the phone number at each of the predetermined time interval until all of the audio communication signals have been transmitted to the second electronic device.

11. The non-transitory storage medium according to claim 9, wherein the voice encoding methods comprises Variable-Rate Multimode Wideband (VMR-WB).

12. The non-transitory storage medium according to claim 10, wherein when all of the audio communication signals have not been transmitted to the second electronic device, a prompt for indicating a user whether the audio file needs to be deleted is displayed on a display device of the first electronic device.

* * * * *